US012385701B2

(12) United States Patent
Kilchyk et al.

(10) Patent No.: US 12,385,701 B2
(45) Date of Patent: Aug. 12, 2025

(54) ADDITIVELY MANUFACTURED TURBOMACHINERY COMPONENTS WITH DESIGNED ATMOSPHERE OF AN INNER VOIDED CORE FOR HEAT TRANSFER CONTROL

(71) Applicant: Hamilton Sundstrand Corporation, Charlotte, NC (US)

(72) Inventors: Viktor Kilchyk, Lancaster, NY (US); Brent J. Merritt, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 451 days.

(21) Appl. No.: 17/661,217

(22) Filed: Apr. 28, 2022

(65) Prior Publication Data
US 2023/0349648 A1    Nov. 2, 2023

(51) Int. Cl.
*F28F 7/02* (2006.01)
*B22F 3/11* (2006.01)
*B22F 5/00* (2006.01)
*B22F 10/28* (2021.01)
(Continued)

(52) U.S. Cl.
CPC .............. *F28F 7/02* (2013.01); *B22F 3/1115* (2013.01); *B22F 5/009* (2013.01); *B22F 10/28* (2021.01); *B22F 10/32* (2021.01); *B33Y 10/00* (2014.12); *B33Y 40/20* (2020.01); *B33Y 50/02* (2014.12); *B33Y 80/00* (2014.12); *B64D 13/08* (2013.01); *F01D 11/00* (2013.01); *F01D 25/24* (2013.01); *F04D 29/023* (2013.01); *F04D 29/083* (2013.01); *F04D 29/285* (2013.01); *F04D 29/4206* (2013.01); *F16J 15/065* (2013.01); *F16J 15/08* (2013.01); *F16J 15/104* (2013.01); *F25B 9/004* (2013.01); *F25B 9/06* (2013.01); *B64D 13/06* (2013.01);
(Continued)

(58) Field of Classification Search
CPC .................................. F28F 7/02; B33Y 80/00
See application file for complete search history.

(56) References Cited

U.S. PATENT DOCUMENTS

| 1,857,961 | A |   | 5/1932 | Lamb |            |
|-----------|---|---|--------|------|------------|
| 2,995,341 | A | * | 8/1961 | Danesi | F22D 1/32 |
|           |   |   |        |        | 165/113   |

(Continued)

FOREIGN PATENT DOCUMENTS

| EP | 1914388 A1 | 4/2008 |
| EP | 4148234 A1 | 3/2023 |

(Continued)

OTHER PUBLICATIONS

Extended European Search Report dated Sep. 12, 2023, for corresponding European Application No. 23169297.1.

*Primary Examiner* — Lionel Nouketcha
(74) *Attorney, Agent, or Firm* — Kinney & Lange, P.A.

(57) ABSTRACT

An additively manufactured component includes an outer shell, the outer shell enclosing a space therein. An inner lattice structure is in the space of the outer shell. Interspaces are formed in the inner lattice structure. A method of forming an additively manufactured component includes evacuating a chamber in which the additively manufactured component will be formed, and forming in the chamber layer by layer an outer shell enclosing a core. The core includes a lattice structure with interspaces formed in the lattice structure.

5 Claims, 7 Drawing Sheets

(51) Int. Cl.
*B22F 10/32* (2021.01)
*B33Y 10/00* (2015.01)
*B33Y 40/20* (2020.01)
*B33Y 50/02* (2015.01)
*B33Y 80/00* (2015.01)
*B64D 13/08* (2006.01)
*F01D 11/00* (2006.01)
*F01D 25/24* (2006.01)
*F04D 29/02* (2006.01)
*F04D 29/08* (2006.01)
*F04D 29/28* (2006.01)
*F04D 29/42* (2006.01)
*F16J 15/06* (2006.01)
*F16J 15/08* (2006.01)
*F16J 15/10* (2006.01)
*F25B 9/00* (2006.01)
*F25B 9/06* (2006.01)
*B64D 13/06* (2006.01)

(52) U.S. Cl.
CPC ............... *B64D 2013/0614* (2013.01); *F05D 2220/40* (2013.01); *F05D 2230/30* (2013.01); *F05D 2230/31* (2013.01); *F05D 2240/55* (2013.01)

(56) References Cited

U.S. PATENT DOCUMENTS

| | | | |
|---|---|---|---|
| 5,249,934 A | 10/1993 | Merritt et al. | |
| 5,545,437 A * | 8/1996 | Nagaraj | C23C 28/345 427/419.7 |
| 5,975,845 A | 11/1999 | Ball | |
| 10,119,411 B2 | 11/2018 | Dimova et al. | |
| 2015/0098805 A1 | 4/2015 | Beers et al. | |
| 2017/0102089 A1 | 4/2017 | Griffin et al. | |
| 2018/0345425 A1* | 12/2018 | Caimano | B23P 15/26 |
| 2019/0024987 A1* | 1/2019 | Moore | F28F 3/02 |
| 2020/0080789 A1* | 3/2020 | Quinn | F28D 7/024 |
| 2020/0141654 A1* | 5/2020 | Ranjan | B23P 15/26 |
| 2020/0318874 A1* | 10/2020 | Snider | F28D 5/00 |

FOREIGN PATENT DOCUMENTS

| | | |
|---|---|---|
| FR | 2738046 A1 | 2/1997 |
| JP | 2001200937 A | 7/2001 |
| WO | 2020216692 A1 | 10/2020 |
| WO | 2021181358 A1 | 9/2021 |

* cited by examiner

ADDITIVELY MANUFACTURED TURBOMACHINERY COMPONENTS WITH DESIGNED ATMOSPHERE OF AN INNER VOIDED CORE FOR HEAT TRANSFER CONTROL

BACKGROUND

The present disclosure relates to additively manufactured components, and in particular, to additively manufactured turbomachinery components.

Turbomachinery components of environmental control systems often utilize two or more rotors within the same casing. Each of the rotors can have different flow streams which have different temperatures. Heat transfer between these rotors degrades unit performance. Therefore, cost effective techniques are desired to minimize parasitic heat fluxes between the rotors. Alternatively, the heat exchanger of the environment control system is desired to have high heat fluxes while decreasing weight and vibrational transfer. Therefore, cost effective techniques are desired to maximize thermal heat fluxes while minimizing vibrational transfer characteristics.

SUMMARY

In one embodiment, an additively manufactured component includes an outer shell, the outer shell enclosing a space therein. An inner lattice structure is in the space of the outer shell. Interspaces are formed in the inner lattice structure.

In another embodiment, a method of forming an additively manufactured component includes evacuating a chamber in which the additively manufactured component will be formed. and forming in the chamber layer by layer an outer shell enclosing a core. The core includes a lattice structure with interspaces formed in the lattice structure.

In another embodiment, an air cycle machine includes a first component which includes an outer shell and a core enclosed by the outer shell. The core includes a lattice structure with interspaces.

Figure 1:
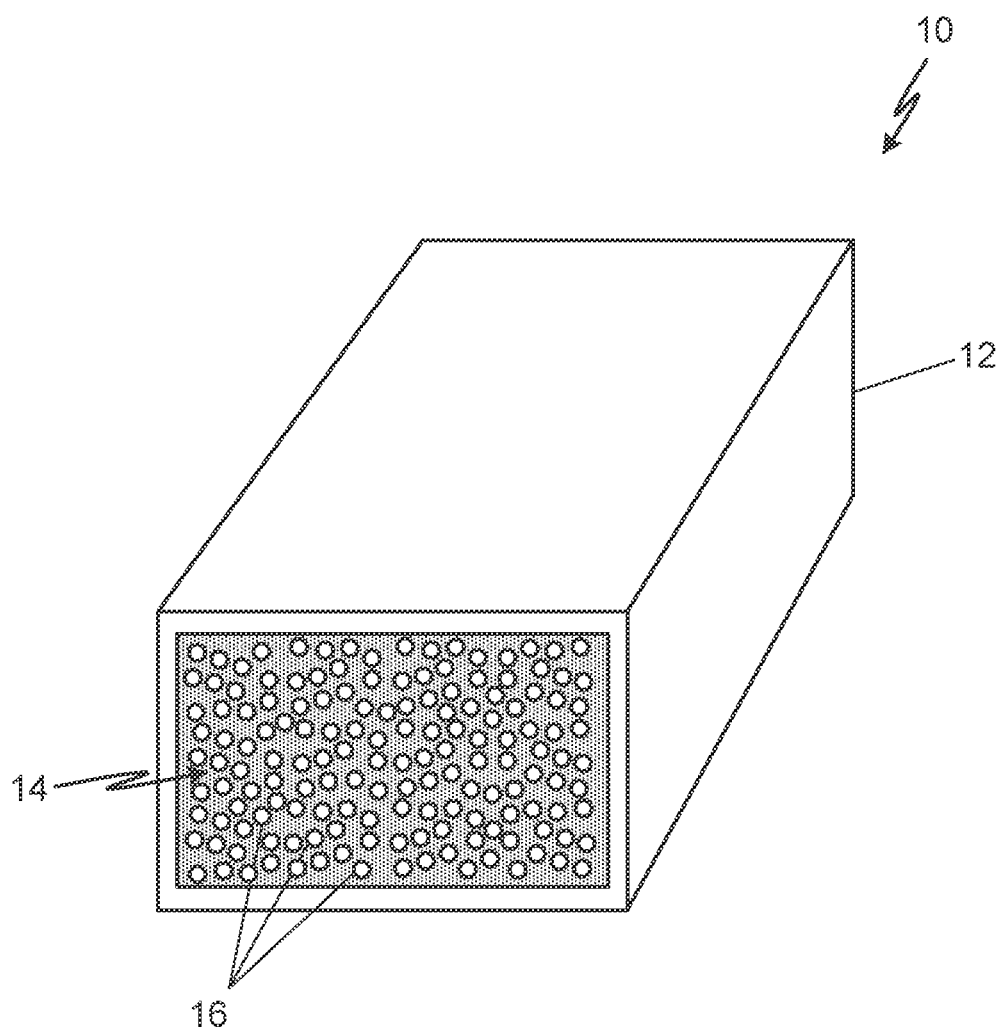
FIG. 1 is a perspective view of an exemplary embodiment of an additively manufactured component with a portion of an outer shell removed to show a core of the additively manufactured component.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings.

DETAILED DESCRIPTION

This disclosure relates to an additively manufactured (AM) component where within the manufactured component there is a lattice structure which has interspaces formed therein. The interspaces can be filled with a selected gas at a selected pressure. By filling the interspaces with the selected gas at the selected pressure the heat and vibrational transfer characteristics can be altered. The AM component will be discussed below with reference to FIGS. 1-5.

FIG. 1 is a perspective view of an exemplary embodiment of additively manufactured component 10. Additively manufactured component 10 includes outer shell 12, inner lattice 14, and interspaces 16. A portion of outer shell 12 is removed in FIG. 1 to show inner lattice 14.

As shown in FIG. 1, inner lattice 14 is a foam metal core enclosed by outer shell 12. Outer shell 12 is also metal and can be formed from the same metal as inner lattice 14 or a different metal. Outer shell 12 of FIG. 1 can be connected to a larger assembly outside of additively manufactured component 10 through welding, brazing, or any other suitable attachment mechanism known to those of skill in the art. In the embodiment of FIG. 1, additively manufactured component 10 is an elongated rectangular rod, however additively manufactured component 10 can be cylindrically shaped, frustoconically shaped, shaped as a rod with a square cross section, shaped as turbomachinery components, or any other suitable shape which has outer shell 12 with inner lattice 14 therein. While additively manufactured component 10 in FIG. 1 is made of metal, additively manufactured component 10 can be formed by direct metal laser sintering, electron beam freeform fabrication, electron-beam melting, selective laser melting, or selective laser sintering in an additive fashion. The powder used to make outer shell 12 and inner lattice 14 can be made of a material selected from the group comprising stainless steel, corrosion-resistant steel, nickel-chromium alloy, titanium, aluminum, synthetic fiber, fiberglass, composites, and combinations thereof. Other suitable materials known to those of skill in the art to be able to be formed in an additive fashion can be used. Inside of outer shell 12 of additively manufactured component 10 is inner lattice 14. Inner lattice 14 has plurality of interspaces 16 therein. Inner lattice 14 is formed by direct metal laser sintering, electron beam freeform fabrication, electron-beam melting, selective laser melting, or selective laser sintering the powder in an additive fashion.

Additively manufactured component 10 can be utilized in any application in which a lighter part is desired and/or in any application in which changes to the heat and vibration transfer characteristics is desired. Such application includes, but is not limited to, seal plates of air cycle machines, rotors of air cycle machines, and rotors of cabin air compressors. Other potential applications include components on aircraft, boats, automobiles, or spacecraft.

Figure 2B:
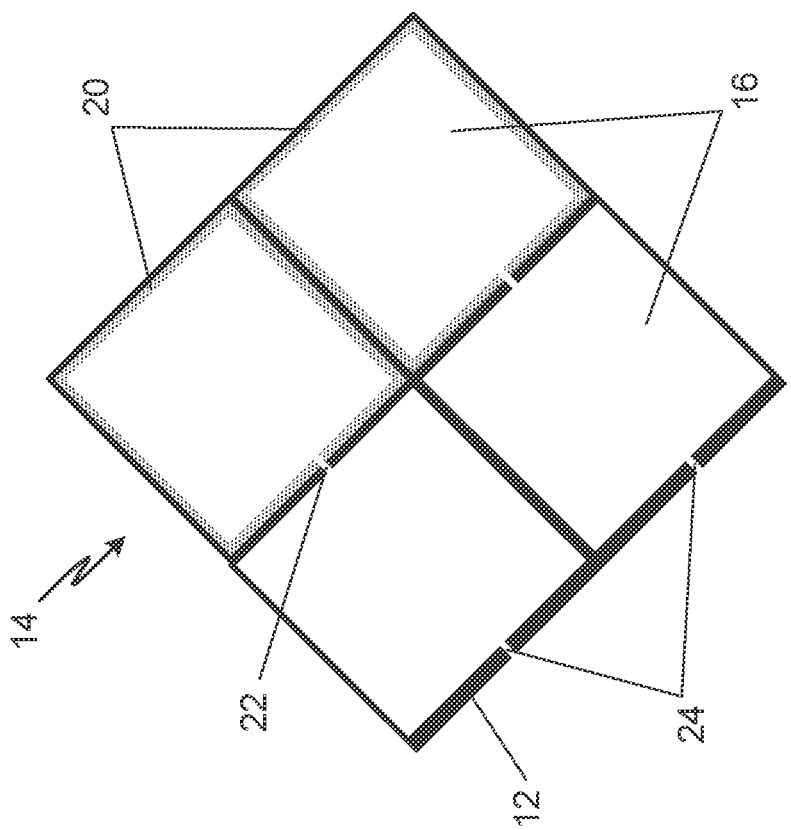
FIG. 2B is a cross sectional view of the rhombus shaped inner lattice where some of the plurality of interspaces are interconnected.
Figure 2A:
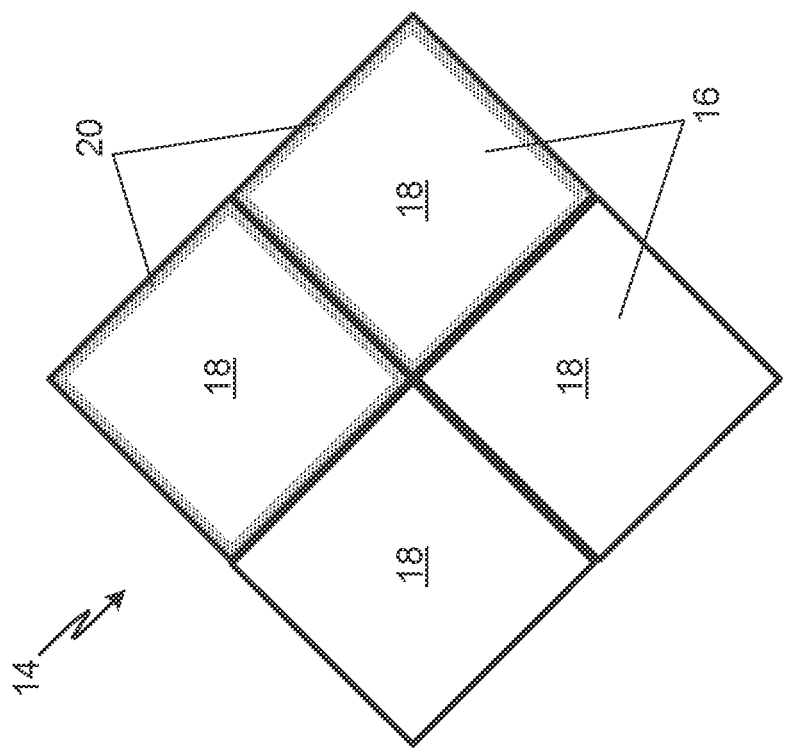
FIG. 2A is a cross sectional view of a rhombus shaped inner lattice where a plurality of interspaces are separated from each other.

FIGS. 2A-2B disclose examples of inner lattice 14 and will be discussed together. FIG. 2A is a cross sectional view of rhombus shaped inner lattice 14 where each interspace 16 of inner lattice 14 is fluidically isolated and separated from each other. FIG. 2B is a cross sectional view of rhombus shaped inner lattice 14 where some of plurality of interspaces 16 are interconnected. Inner lattice 14 is composed of plurality of interspaces 16. Each interspace 16 can be filled with heat transfer medium 18, as shown in FIG. 2A, and can optionally be coated with thermal radiation reflective coating 20. As shown in FIG. 2B, each of plurality of interspaces 16 can be connected to each other through plurality of lattice interconnections 22. Lattice interconnections 22 are passages that fluidically connect interspaces 16 with each other. Plurality of interspaces 16 can be connected to an ambient atmosphere through plurality of pressure equilibrium holes 24. Pressure equilibrium holes 24 in FIG. 2B extend through outer shell 12 to connect plurality of interspaces 16 and plurality of lattice interconnections 22 to ambient atmosphere.

Inner lattice 14 can be rhombus shaped as shown in the embodiments of FIGS. 2A and 2B. Alternatively inner lattice 14 can be triangular, quadrangular, hexagonal, spherical, non-symmetrical, or any other shape known to those of skill in the art to be able to form plurality of interspaces 16 in inner lattice 14. Inner lattice 14 can be formed at the same time as forming outer shell 12 and can be integral with outer shell 12. As such, inner lattice 14 can be formed of the same materials as outer shell 12 as discussed above with respect to FIG. 1.

Each of interspaces 16 can be filled with heat transfer medium 18. Heat transfer medium 18 can be a selected fluid at a selected pressure. The selected fluid can be a gas which can comprises at least one of krypton, argon, xenon, nitrogen, oxygen, and combinations thereof. The selected gas can further comprise any gas known to those of skill in the art as being insertable into interspaces 16. The selected fluid can also be a liquid. The selected liquid can comprise at least one of water, oil, heat-transfer fluid, coolant, and combinations thereof. The selected liquid can further comprise any liquid known to those of skill in the art as being insertable into interspaces 16. The selected pressure can be less than 0.3 atmosphere (ATM), which is approximately the pressure experienced by aerospace components at a cruising altitude of a plane. Alternatively, the selected pressure can be less than 0.03 ATM, which is considered a low vacuum. Alternatively, the selected pressure could be less than 0.003 ATM which is considered a medium vacuum. When heat transfer medium 18 is inserted at pressures which are considered low vacuum, medium vacuum, or at even lower pressures, additively manufactured component 10 can conduct heat through the component at significantly slower rates and vibrational transfer through additively manufactured component 10 can be significantly reduced.

Heat transfer medium 18 can be inserted into inner lattice 14 either during or after formation of interspaces 16. Insertion of heat transfer medium 18 during formation of interspaces 16 comprises at least evacuating a chamber of the additive manufacturing machine used to form additively manufactured component 10. The chamber is then filled with the selected fluid at the selected pressure. While the chamber is filled with the selected fluid at the selected pressure, the additive manufacturing machine forms additively manufactured component 10 in the chamber, thus trapping the selected fluid at the selected pressure within interspaces 16 of additively manufactured component 10. Alternatively, heat transfer medium 18 can be inserted into interspaces 16 after formation of additively manufactured component 10. If additively manufactured component 10 has plurality of lattice interconnections 22 and pressure equilibrium holes 24, the selected fluid can be inserted into interspaces 16 at the selected pressure through pressure equilibrium holes 24 and into deeper interspaces 16 of additively manufactured component 10 through lattice interconnections 22. After insertion of heat transfer medium 18, pressure equilibrium holes 24 can be sealed, sealing in heat transfer medium 18.

Thermal radiation reflective coating 20 can be coated on the insides of each of interspaces 16. Thermal radiation reflective coating 20 is shown coated on the inside of a top rhombus interspace 16 and a right rhombus interspace 16 in FIGS. 2A and 2B. Thermal radiation reflective coating 20 can be coated on any number of interspaces 16 ranging from zero to n, where n is the number of interspaces 16. When coated on zero interspaces, none of interspaces 16 are coated with thermal radiation reflective coating 20 and when coated on n interspaces, all of interspaces 16 are coated with thermal radiation reflective coating 20. Thermal radiation reflective coating 20 reflects the thermal radiation that radiates from the object due to its increased temperature. Thermal radiation reflective coating 20 reduces the internal heat transfer of additively manufacture component 10. Thermal radiation reflective coating 20 can be applied to interspaces 16 via a chemical or physical layer deposition. Thermal radiation reflective coating 20 can be formed directly into the side walls of interspaces 16 when additively manufacturing additively manufactured component 10.

Interspaces 16 can be sectioned-off to form multiple sections of interspaces 16 within additively manufactured component 10 where each section of interspaces 16 is fluidically isolated from the other sections of interspaces 16. In the example shown in FIG. 2B, inner lattice 14 includes two sections of interspaces 16. A single lattice interconnection 22 connects the top rhombi interspace 16 and the left rhombi interspace 16 to form a first section of connected interspaces 16 that share the same heat transfer medium 18. The left rhombi interspace 16 and the bottom rhombi interspace 16 are connected by a single lattice interconnection 22 to form a second section of connected interspaces 16 that share the same heat transfer medium 18 and that is fluidically isolated from the first section of connected interspaces 12 if pressure equilibrium holes 24 are sealed.

Pressure equilibrium holes 24 extend through outer shell 12 into at least one or more of interspaces 16. Pressure equilibrium holes 24 fluidically connect the at least one or more interspaces 16 to an outside ambient atmosphere with an ambient pressure. Pressure equilibrium holes 24 allow for an internal pressure within interspaces 16 of additively manufactured component 10 to be substantially the same as the ambient pressure. Interspaces 16 connected by lattice interconnections 22 to interspaces 16 with equilibrium holes 24 can also equilibrate to the ambient pressure. Maintaining interspaces 16 at the ambient pressure can reduce deflection, expansion or contraction of the part compared to maintaining interspaces 16 at a specific pressure if the pressure outside the part changes substantially.

Figure 3A:
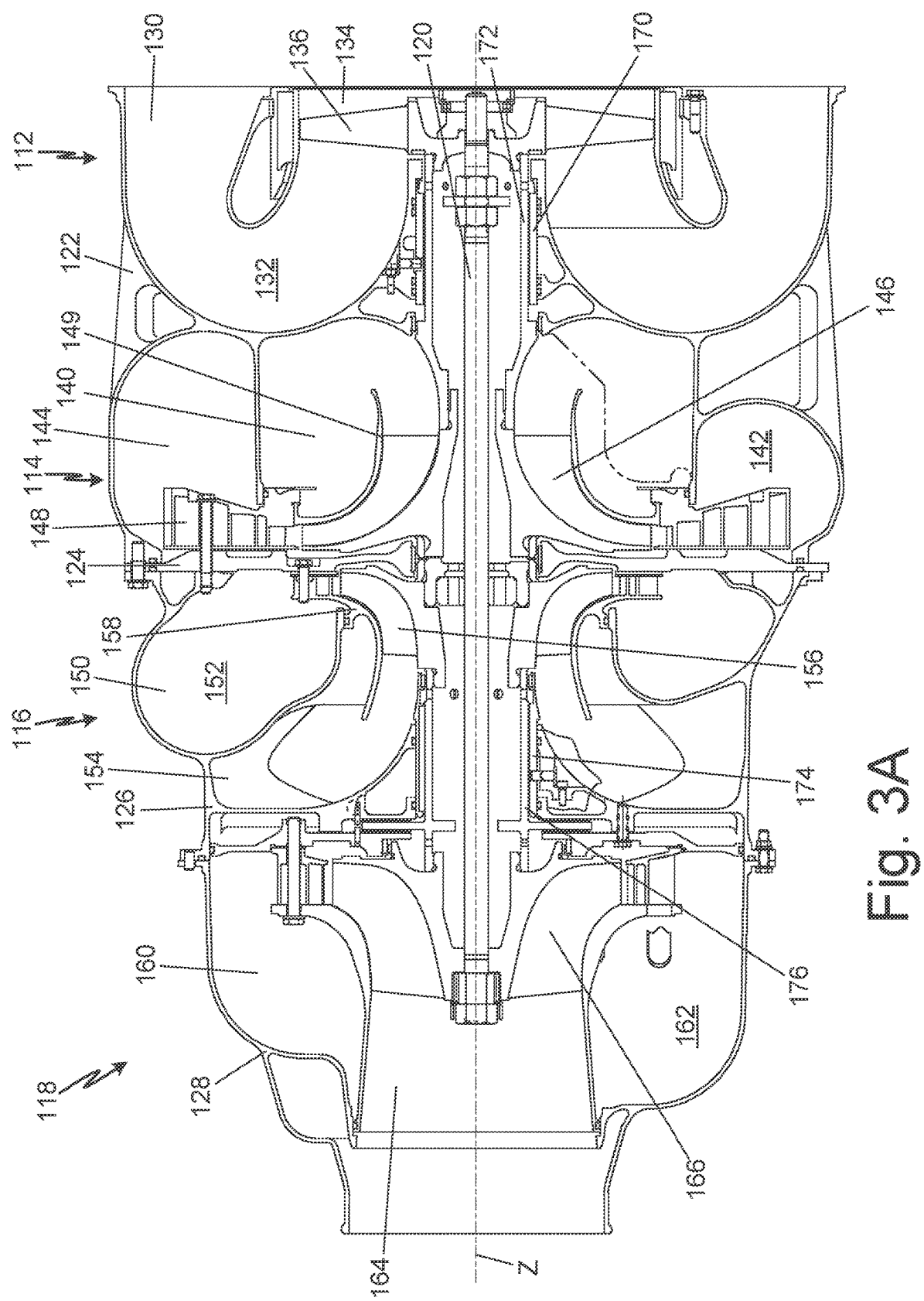
FIG. 3A is a cross-sectional view of an air cycle machine.
Figure 3B:
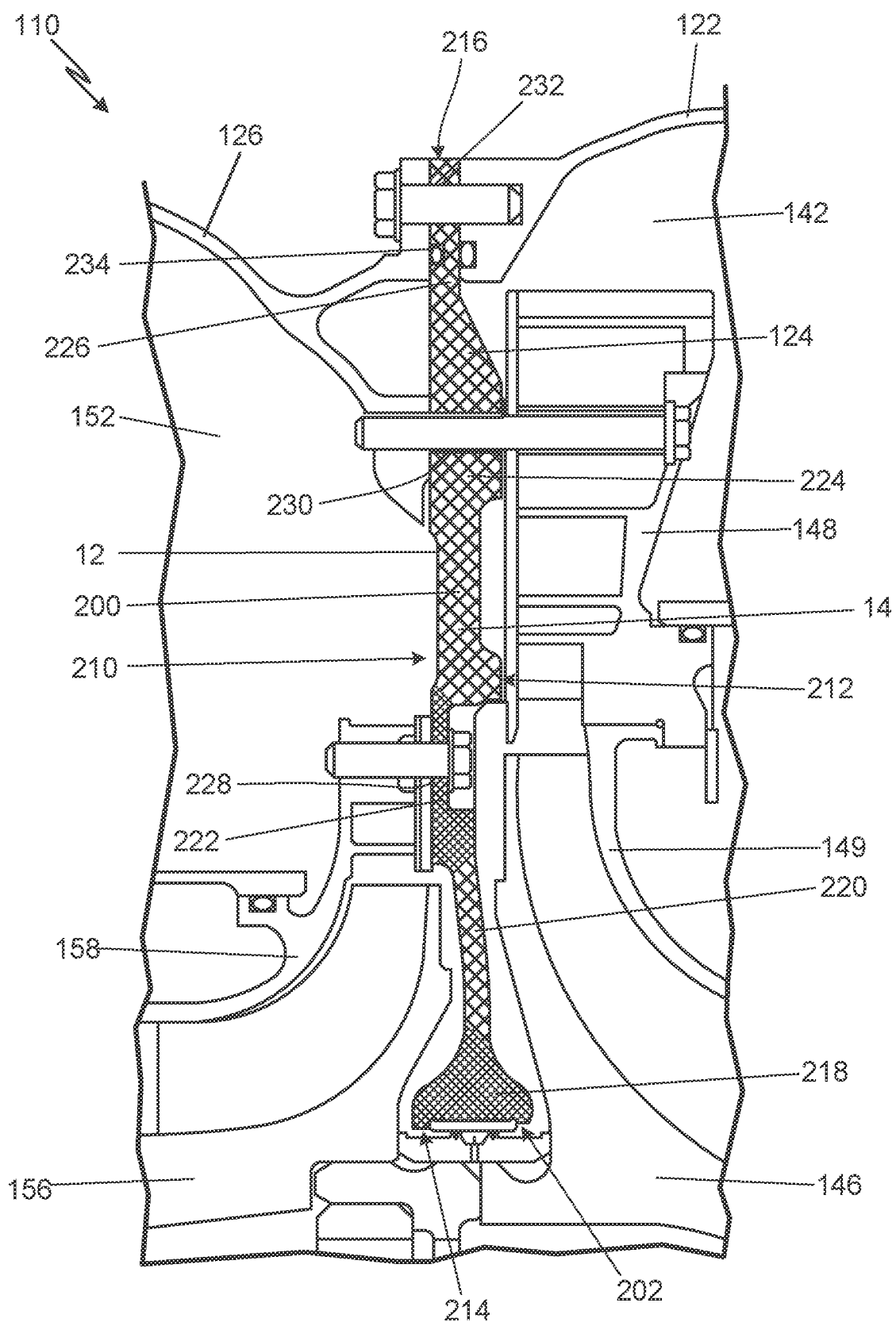
FIG. 3B is a cross-sectional view of an insulating seal plate positioned in the air cycle machine.
Figure 3C:
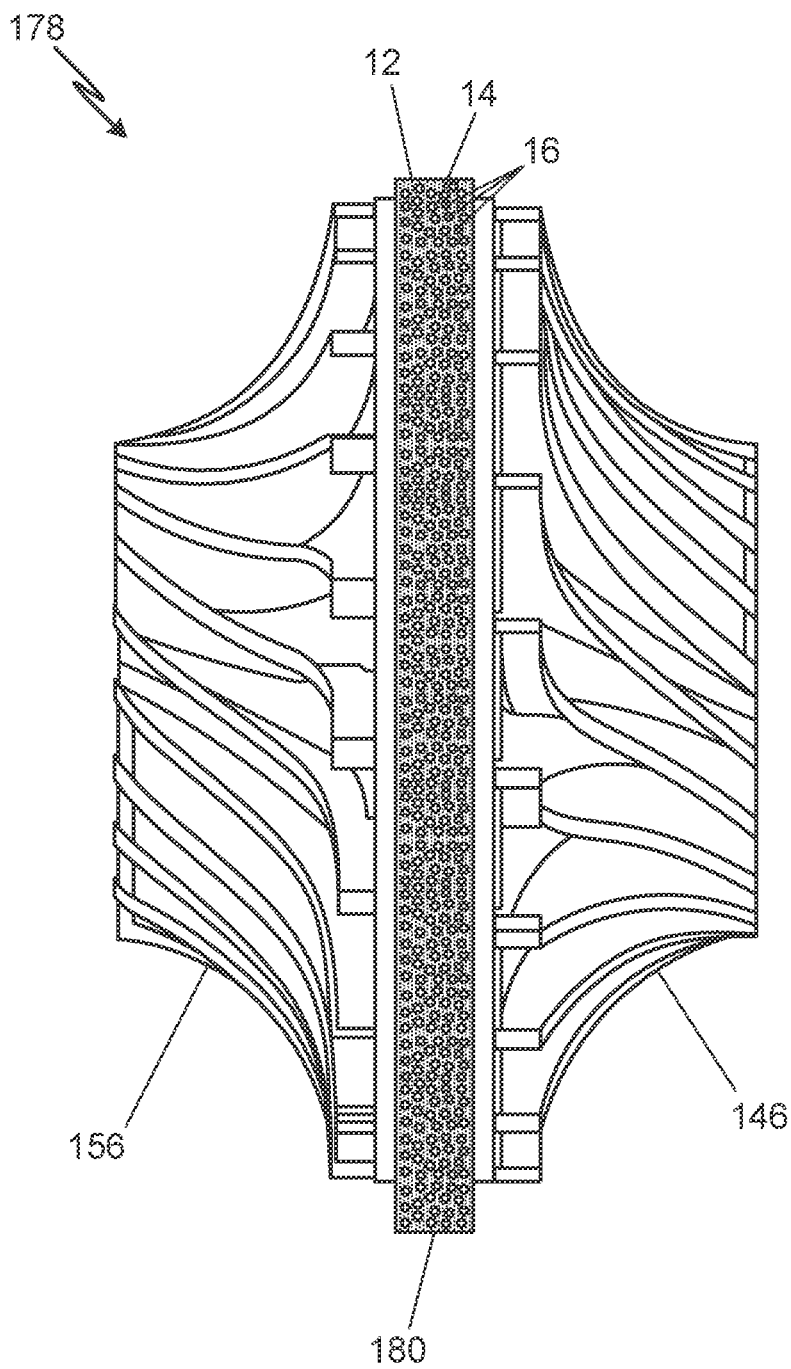
FIG. 3C is a side view of a dual-rotor component with an insulating lattice structure.

FIGS. 3A-3C will be discussed together since they show air cycle machine 110 and two applications of AM turbomachinery component 10 in air cycle machine 110. FIG. 3A is a cross-sectional view of air cycle machine 110. FIG. 3B is a cross-sectional view of insulating seal plate 124 positioned in air cycle machine 110. FIG. 3C is a side view of dual-rotor component 178 with insulating lattice structure 180 therebetween with a portion of an outer shell removed to show insulating lattice structure 180.

FIG. 3A is a cross-sectional view of air cycle machine 110, which includes fan section 112, compressor section 114, first turbine section 116, second turbine section 118, tie rod 120, fan and compressor housing 122, seal plate 124, first turbine housing 126, and second turbine housing 128. Fan section 112 includes fan inlet 130, fan duct 132, fan outlet 134, and fan rotor 136. Compressor section 114 includes compressor inlet 140, compressor duct 142, compressor outlet 144, compressor rotor 146, diffuser 148, and compressor rotor shroud 149. First turbine section 116 includes first turbine inlet 150, first turbine duct 152, first turbine outlet 154, first turbine rotor 156, and first turbine rotor shroud 158. Second turbine section 118 includes second turbine inlet 160, second turbine duct 162, second turbine outlet 164, and second turbine rotor 166. Air cycle machine 110 further includes first journal bearing 170, first rotating shaft 172, second journal bearing 174, and second rotating shaft 176. Also shown in FIG. 1 is axis Z.

Fan section 112, compressor section 114, first turbine section 116, and second turbine section 118 are all mounted on tie rod 120. Tie rod 120 rotates about axis Z. Fan and compressor housing 122 is connected to seal plate 124 and first turbine housing 126 with fasteners. Seal plate 124 separates flow paths in fan and compressor housing 122 from flow paths in first turbine housing 126. First turbine housing 126 is connected to second turbine housing 128 with fasteners. Fan and compressor housing 122, first turbine housing 126, and second turbine housing 128 together form an overall housing for air cycle machine 110. Fan and compressor housing 122 houses fan section 112 and compressor section 114, first turbine housing 126 houses first turbine section 116, and second turbine housing 128 houses second turbine section 118.

Fan section 112 includes fan inlet 130, fan duct 132, fan outlet 134, and fan rotor 136. Fan section 112 typically draws in ram air from a ram air scoop or alternatively from an associated gas turbine or other aircraft component. Air is drawn into fan inlet 130 and is ducted through fan duct 132 to fan outlet 134. Fan rotor 136 is positioned in fan duct 132 adjacent to fan outlet 134 and is mounted to and rotates with tie rod 120. Fan rotor 136 draws air into fan section 112 to be routed through air cycle machine 110.

Compressor section 114 includes compressor inlet 140, compressor duct 142, compressor outlet 144, compressor rotor 146, and diffuser 148. Air is routed into compressor inlet 140 and is ducted through compressor duct 142 to compressor outlet 144. Compressor rotor 146 and diffuser 148 are positioned in compressor duct 142. Compressor rotor 146 is mounted to and rotates with tie rod 120 to compress the air flowing through compressor duct 142. Diffuser 148 is a static structure through which the compressor air can flow after the air has been compressed with compressor rotor 146. Air exiting diffuser 148 can then exit compressor duct 142 through compressor outlet 144. Compressor rotor shroud 149 is positioned radially outward from and surrounds compressor rotor 146.

First turbine section 116 includes first turbine inlet 150, first turbine duct 152, first turbine outlet 154, first turbine rotor 156, and first turbine rotor shroud 158. Air is routed into first turbine inlet 150 and is ducted through first turbine duct 152 to first turbine outlet 154. First turbine rotor 156 is positioned in first turbine duct 152 and is mounted to and rotates with tie rod 120. First turbine rotor 156 will extract energy from the air passing through first turbine section 116 to drive rotation of tie rod 120. First turbine rotor shroud 158 is positioned radially outward from and surrounds first turbine rotor 56.

Second turbine section 118 includes second turbine inlet 160, second turbine duct 162, second turbine outlet 164, and second turbine rotor 166. Air is routed into second turbine inlet 160 and is ducted through second turbine duct 162 to second turbine outlet 164. Second turbine rotor 166 is positioned in second turbine duct 162 and is mounted to and rotates with tie rod 120. Second turbine rotor 166 will extract energy from the air passing through second turbine section 118 to drive rotation of tie rod 120.

FIG. 3B is a cross-sectional view of seal plate 124 positioned in air cycle machine 110. FIG. 3B shows fan and compressor housing 122, seal plate 124, first turbine housing 126, compressor duct 142, compressor rotor 146, diffuser 148, compressor rotor shroud 149, first turbine duct 152, first turbine rotor 156, first turbine rotor shroud 158. Seal plate 124 includes body 200 and bore 202. Body 200 includes first side 210, second side 212, radially inner end 214, radially outer end 216, hub 218, first disk portion 220, second disk portion 222, third disk portion 224, fourth disk portion 226, first plurality of holes 228, second plurality of holes 230, third plurality of holes 232, and groove 234. As shown in FIG. 4, body 200 further includes outer shell 12 and inner lattice structure 14.

Air cycle machine 110 has a similar structure to the structure and design of additively manufactured component 10 as described above in reference to FIG. 3A. Seal plate 124 includes body 200 with bore 202 extending through a center of body 200. Body 200 has a plate shape and includes first side 210 and second side 212 opposite of first side 210. Body 200 also has radially inner end 214 and radially outer end 216 opposite of radially inner end 214. Radially inner end 214 of body 200 defines bore 202 extending through body 200 of seal plate 124.

Body 200 includes hub 218 extending from radially inner end 214 and positioned adjacent to bore 202. Hub 218 is a center portion of body 200. First disk portion 220 of body 200 extends radially outward from hub 218. Second disk portion 222 of body 200 extends radially outward from first disk portion 220. Third disk portion 224 of body 200 extends radially outward from second disk portion 222. Fourth disk portion 226 of body 200 extends radially outward from third disk portion 224 to radially outer end 216. First plurality of holes 228 are positioned around and extend through second disk portion 222 of body 200. Second plurality of holes 230 are positioned around and extend through third disk portion 224 of body 200. Third plurality of holes 232 are positioned around and extend through fourth disk portion 226 of body 200. Groove 234 is positioned on fourth disk portion 226 of body 200 and extends into body 200 from second side 212 of body 200. Groove 234 is configured to receive an o-ring to seal against other components of air cycle machine 110.

Outer shell 12 completely surrounds inner lattice structure 14 in an interior of body 200 and forms an exterior of seal plate 124. Outer shell 12 is a solid, continuous surface. Inner lattice structure 14 is a lattice structure. Inner lattice structure 14 can take any shape as discussed above with respect to FIGS. 1-2B. Inner lattice structure 14 includes members arranged in a 3D crisscrossing pattern with interspaces 16 between the members. Inner lattice structure 14 can vary in density as shown in FIG. 3B.

Seal plate 124 can be additively manufactured. Any suitable additive manufacturing process (also known as a 3D printing process) can be used to manufacture seal plate 124, including, any process discussed above with respect to FIGS. 1-2B. Seal plate 124 can be made from any material that can be used in an additive manufacturing process as discussed above with respect to FIGS. 1-2B.

Traditional seal plates for rotary machines have solid cross-sections and can be manufactured by subtractive manufacturing processes, such as hogout, or compression molding. Additively manufacturing seal plate 124 allows inner lattice structure 14 to be used in seal plate 124. Using inner lattice structure 14 in seal plate 124 allows seal plate 124 to have a reduced weight compared to traditional seal plates, as there are hollow interspaces 16 within inner lattice structure 14. Seal plate 124 has an equivalent strength as traditional seal plates due to the increased strength provided by inner lattice structure 14.

Inner lattice structure 14 in seal plate 124 can also improve the thermal resistance of seal plate 124. Seal plate 124 is used as a heat transfer barrier between compressor section 114 and first turbine section 116. Manufacturing seal plate 124 with inner lattice structure 14 improves the thermal resistance of seal plate 124, as there are interspaces 16 in inner lattice structure 14 that reduce the thermal conductivity of seal plate 124 while improving the insulating abilities of seal plate 124. As discussed above with respect to FIGS. 1-2B, interspaces 16 can be filled with heat transfer medium 18 to further impede heat transfer from first side 210 to second side 212. As discussed above with respect to FIGS. 1-2B, the pressure of the heat transfer medium 18 can be substantially near a vacuum, thus significantly reducing the heat transfer through seal plate 124. As discussed above with respect to FIGS. 1-2B, interspaces 16 can be coated with thermal radiation reflective coating 20 which further impedes heat transfer from first side 210 to second side 212. These improvements further improve the ability of seal plate 124 to reduce parasitic heat fluxes which would otherwise reduce the efficiency of air cycle machine 110. These parasitic heat fluxes originate from the fact that second side 212 is at an increased temperature compared to first side 210. Heat transfer across seal plate 124 is energy lost to entropy, thus the energy lost to heat transfer cannot do useful work.

Inner lattice structure 14 in seal plate 124 can also improve the vibrational transfer characteristics of seal plate 124. As discussed above with respect to FIGS. 1-2B, interspaces 16 can be filled with heat transfer medium 18 at a selected pressure. The lower the pressure in interspaces 16, the less noise that propagates through seal plate 124. As such, seal plate 124 will transfer significantly less noise from one section of air cycle machine 110 to the other sections.

Hub 218 of seal plate 124 abuts a seal that interfaces with rotating components, including compressor rotor 146 and first turbine rotor 156 of air cycle machine 110. A first side of first disk portion 220 of seal plate 124 is positioned adjacent first turbine rotor 156, and a second side of first disk portion 220 of seal plate 124 is positioned adjacent compressor rotor 146. A first side of second disk portion 222 of seal plate 124 abuts first turbine rotor shroud 158. Bolts extend through first plurality of holes 228 in second disk portion 222 to bolt seal plate 124 to first turbine rotor shroud 158. A second side of second disk portion 222 of seal plate 124 is positioned adjacent to a radially outer end of compressor rotor 146. A first side of third disk portion 224 of seal plate 124 abuts a flange of first turbine housing 126, and a second side of third disk portion 224 of seal plate 124 abuts diffuser 148. Bolts extend through second plurality of holes 230 to bolt seal plate 124 between diffuser 148 and first turbine housing 126. Fourth disk portion 226 of seal plate 124 is positioned between and fan and compressor housing 122 and first turbine housing 126. Bolts extends through third plurality of holes 232 to bolt seal plate 124 between fan and compressor housing 122 and first turbine housing 126.

There are gaps between compressor rotor 146 and surrounding components, such as compressor rotor shroud 149, and between first turbine rotor 156 and surrounding components, such as first turbine rotor shroud 158, to prevent contact between compressor rotor 146 and first turbine rotor 156 and surrounding components. Contact between compressor rotor 146 and first turbine rotor 156 and surrounding components can damage the components. The gaps between compressor rotor 146 and first turbine rotor 156 and surrounding components have to account for deflections that compressor rotor 146 and first turbine rotor 156 and surrounding components, such as seal plate 124, can be subjected to during operation of compressor rotor 146 and first turbine rotor 156 as well as deflections induced by pressure changes. Thus, the more deformation that compressor rotor 146, first turbine rotor 156, and seal plate 124 are subjected to during operation of compressor rotor 146 and first turbine rotor 156, the larger the gaps need to be to ensure component safety. However, air can leak from air cycle machine 110 through the gaps, which leads to inefficiencies in air cycle machine 110. Thus, minimizing the gaps between compressor rotor 146 and first turbine rotor 156 and surrounding components is desired. If seal plate 124 has pressure equilibrium holes 24 in outer shell 12, seal plate 124 would not deflect as much due to pressure induced changes, thus reducing the minimum sizes required for the gaps.

Seal plate 124 is one example of a seal plate in which inner lattice structure 14 can be used. In alternate embodiments, inner lattice structure 14 can be used in any suitable seal plate having any geometry. Further, air cycle machine 110 is one example of a turbomachinery or rotary machine in which seal plate 124 or any other seal plate with inner lattice structure 14 can be used. In alternate embodiments, seal plate 124 or any other seal plate with inner lattice structure 14 can be used in any other rotary machine having a seal plate.

FIG. 3C is a side view of dual-rotor component 178 with dual rotor interconnection plate 180 therebetween. Dual rotor component 178 includes compressor rotor 146 and first turbine rotor 156. Between and connecting compressor rotor 146 and first turbine rotor 156 is dual rotor interconnection plate 180 which includes outer shell 12 and inner lattice structure 14.

Dual rotor component 178 is an alternative embodiment to those discussed above in reference to FIGS. 3A and 3B. Dual rotor component combines compressor rotor 146 and first turbine rotor 156 of FIGS. 3A and 3B into a single component. As such, first disk portion 220 of seal plate 124 can be removed. Further the gap between first turbine rotor 156 and first side 210 of seal plate 124 as well as the gap between compressor rotor 146 and second side 212 of seal plate 124 can be removed. Removing these gaps increases the efficiency of air cycle machine 110. However, parasitic heat fluxes from a hot side on compressor rotor 146 to a cold side on first turbine rotor 156 can affect efficiency. These parasitic heat fluxes can be reduced significantly by dual rotor interconnection plate 180.

Dual rotor interconnection plate 180 includes outer shell 12 and inner lattice structure 14. Inner lattice structure 14 can have interspaces 16 therein. As discussed above with respect to FIGS. 1-2B interspaces 16 of inner lattice structure 14 of dual rotor interconnection 180 can be filled with heat transfer medium 18. Heat transfer medium 18 can alter the heat flux dynamics of dual rotor 178, reducing the parasitic heat fluxes thus negating the primary reason not to combine compressor rotor 146 and first turbine rotor 156 into a single component. Further, as discussed above with respect to FIGS. 1-2B, interspaces 16 of inner lattice structure 14 can be coated with thermal radiation reflective coating 20, further reducing the parasitic heat fluxes through the component.

Alternatively, interspaces 16 of inner lattice structure 14 of dual rotor interconnection 180 can be connected to an ambient atmosphere through pressure equilibrium holes 24 (not shown in FIG. 3C). By connecting interspaces 16 to the ambient atmosphere, if the pressure changes drastically, the part will not expand or contract as a result of the pressure change. As such, the gaps between compressor rotor 146 and compressor rotor shroud 149 as well as the gaps between first compressor rotor 156 and first rotor shroud 158 can be further reduced, increasing the efficiency of air cycle machine 110. Increasing the efficiency of air cycle machine 110 is important as increased efficiency enables a reduction in the size and weight of air cycle machine to achieve the same results and thus decreases fuel burn rate on an aircraft.

Figure 4A:
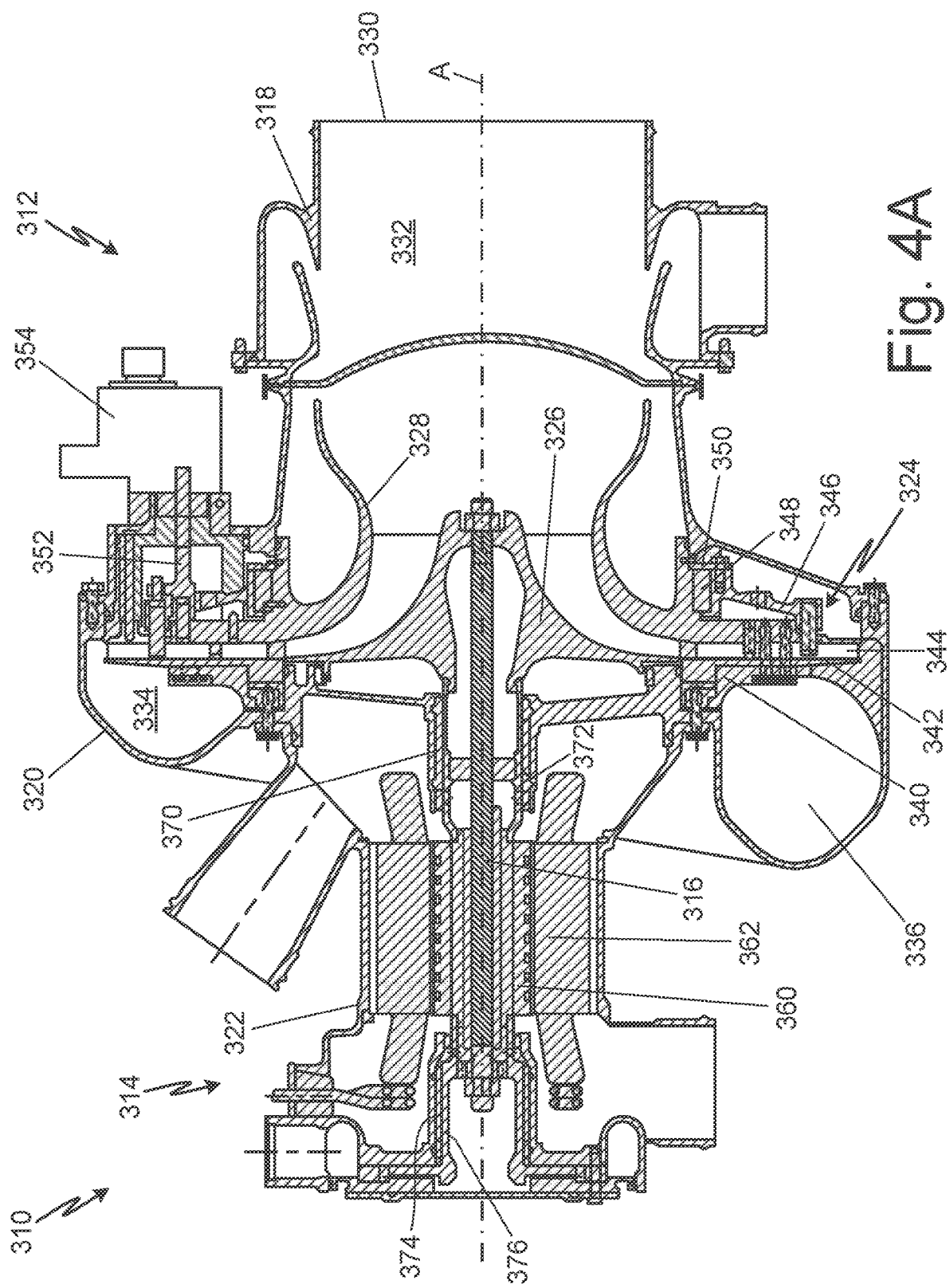
FIG. 4A is cross-sectional view of a cabin air compressor.
Figure 4B:
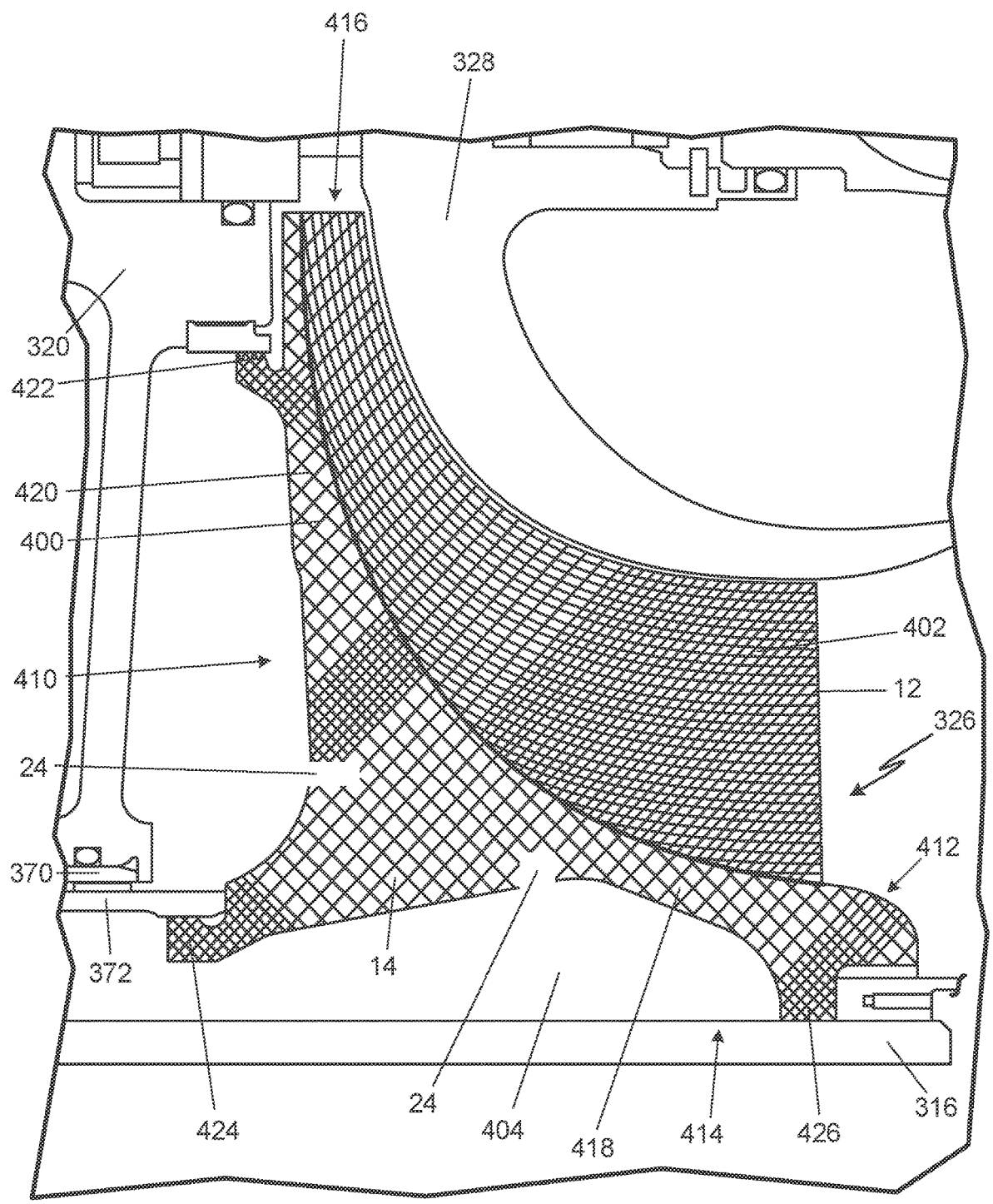
FIG. 4B is a cross-sectional view of a rotor of the cabin air compressor with pressure equilibrium holes.

FIGS. 4A and 4B will be discussed together since they show cabin air compressor 310 and an application of AM turbomachinery component 10 in cabin air compressor 310. FIG. 4A is cross-sectional view of cabin air compressor 310. FIG. 4B is a cross-sectional view of rotor 326 with pressure equilibrium holes 24 positioned in cabin air compressor 310.

FIG. 4A is a cross-sectional view of cabin air compressor 310. Cabin air compressor 310 includes compressor section 312, motor section 314, tie rod 316, compressor inlet housing 318, compressor outlet housing 320, motor housing 322, variable diffuser 324, rotor 326, and rotor shroud 328. Compressor inlet housing 318 includes inlet 330 and inlet duct 332. Compressor outlet housing 320 includes outlet duct 334 and outlet 336. Variable diffuser 316 includes backing plate 340, inboard plate 342, diffuser vanes 344, drive ring 346, drive ring bearing 348, backup ring 350, pinion 352, and variable diffuser actuator 354. Motor section 314 includes motor rotor 360 and motor stator 362. Cabin air compressor 310 further includes first journal bearing 370, first rotating shaft 372, second journal bearing 374, and second rotating shaft 376. FIG. 4A also shows axis A.

Cabin air compressor 310 includes compressor section 312 and motor section 314 mounted on tie rod 316. Tie rod 316 is configured to rotate about axis A. Compressor section 312 includes compressor inlet housing 318 and compressor outlet housing 320 that are connected to one another. Motor section 314 includes motor housing 322, which is connected to compressor outlet housing 320. Variable diffuser 324 is positioned between compressor inlet housing 318 and compressor outlet housing 320. Rotor 326 is positioned between compressor inlet housing 318 and compressor outlet housing 320. Rotor 326 is mounted on tie rod 316, which rotatably connects rotor 326 and motor section 314. Rotor shroud 328 is positioned radially outward from and partially surrounds compressor rotor 326.

Compressor inlet housing 318 includes inlet 330 and inlet duct 332. Inlet 330 is positioned at a first end of compressor inlet housing 318. Inlet duct 332 extends from inlet 330 through compressor inlet housing 318 to rotor 326. Compressor outlet housing 320 includes outlet duct 334 and outlet 336. Outlet duct 334 extends through compressor outlet housing 320 from rotor 326 to outlet 336.

Variable diffuser 316 includes backing plate 340, inboard plate 342, diffuser vanes 344, drive ring 346, drive ring bearing 348, pinion 350, backup ring 352, and variable diffuser actuator 354. Backing plate 340 abuts compressor outlet housing 320 on a first side and inboard plate 342 on a second side. Inboard plate 342 abuts backing plate 340 on a first side and diffuser vanes 344 on a second side. Diffuser vanes 344 abut inboard plate 342 on a first side and rotor shroud 328 on a second side. Diffuser vanes 344 are configured to direct the compressed air from rotor 326 into outlet duct 334. Drive ring 346 is positioned radially outward from rotor shroud 328, and drive ring bearing 348 is positioned between driver ring 346 and rotor shroud 328. Drive ring 346 abuts rotor shroud 328 on a first side and backup ring 350 on a second side. Backup ring 350 is positioned radially outward of rotor shroud 328. Pinion 352 is connected to variable diffuser actuator 354 and is coupled to drive ring 346. Pinion 352 permits control of variable diffuser 316. Drive ring 346 is coupled to diffuser vanes 344 with pins, and as drive ring 346 is rotated drive ring 346 will drag diffuser vanes 344 and cause them to rotate.

Motor section 314 includes motor housing 322, motor rotor 360, and motor stator 362. Motor housing 322 surrounds motor rotor 360 and motor stator 362. Motor rotor 360 is disposed within motor stator 362 and is configured to rotate about axis A. Motor rotor 360 is mounted to tie rod 316 to drive rotation of tie rod 316.

Motor rotor 360 of motor section 314 drives rotation of shafts in cabin air compressor 310, which rotates rotor 326. The rotation of rotor 326 draws air into inlet 330 of compressor inlet housing 318. The air flows through inlet duct 332 to rotor 326 and will be compressed by rotor 326. The compressed air is then routed through variable diffuser 316 and into outlet duct 334 of compressor outlet housing 320. The air then exits cabin air compressor 310 through outlet 336 of compressor outlet housing 320 and can be routed to another component of an environmental control system, such as an air cycle machine.

Cabin air compressor 310 further includes first journal bearing 370, first rotating shaft 372, second journal bearing 374, and second rotating shaft 376. First journal bearing 370 is positioned in compressor section 312 and is supported by compressor outlet housing 320. First rotating shaft 372 extends between and rotates with rotor 326 and motor rotor 360. Motor rotor 360 drives rotation of rotor 326 with first rotating shaft 372. A radially outer surface of first rotating shaft 372 abuts a radially inner surface of first journal bearing 370. Second journal bearing 374 is positioned in motor section 314 and is supported by motor housing 322. Second rotating shaft 376 extends from and rotates with motor rotor 360. A radially outer surface of second rotating shaft 376 abuts a radially inner surface of second journal bearing 374.

FIG. 4B is a cross-sectional view of rotor 326 from FIG. 4A positioned in cabin air compressor 310. FIG. 4B shows tie rod 316, compressor outlet housing 320, rotor 326, rotor shroud 328, first journal bearing 370, and first rotating shaft 372 of cabin air compressor 310. Rotor 326 includes hub 400, blades 402, and bore 404. Hub 400 includes first side 410, second side 412, radially inner end 414, radially outer end 416, shaft portion 418, disk portion 420, first flange 422, second flange 424, and third flange 426. As shown in FIG. 4B, rotor 326 further includes outer shell 12, inner lattice structure 14, and pressure equilibrium holes 24.

Rotor shroud 328 is positioned radially outward from rotor 326 and partially surrounds rotor 326. Rotor 326 includes hub 400 and blades 402 attached to and extending outward from hub 400. Bore 404 extends through a center of hub 400 and a tie rod of a rotary machine can extend through bore 404. Hub 400 has first side 410 and second side 412 opposite of first side 410. Hub 400 also has radially inner end 414 and radially outer end 416 opposite of radially inner end 414. Radially inner end 414 defines bore 404 extending through hub 400 of rotor 326.

Hub 400 has shaft portion 418 that extends axially from first side 410 to second side 412 of hub 400 along axis A. When in operation, rotor 326 increases the pressure in a flow path which is on second side 412, while the pressure on a backside of rotor 326 outside of the flow path, which is on first side 410 would stay at an ambient pressure. Disk portion 420 extends radially outwards from shaft portion 418 toward radially outer end 416 of hub 400 near first end 410 of hub 400. Hub 400 further includes first flange 422, second flange 424, and third flange 426. First flange 422 is positioned on disk portion 420 near radially outer end 416 of hub 400 and extends axially outward from first side 410 of hub 400. First flange 422 of hub 400 of rotor 326 forms a labyrinth seal that seals against compressor outlet housing 320. As rotor 326 rotates with tie rod 316, the labyrinth seal on first flange 422 will rotate against compressor outlet housing 320, which is a stationary component of cabin air compressor 310. Second flange 424 is positioned on shaft portion 418 at first side 410 of hub 410 and extends axially outward from first side 410 of hub 400. Second flange 424 of hub 400 of rotor 326 abuts and rotates with first rotating shaft 372. Third flange 426 is positioned on shaft portion 418 near second side 412 of hub 400 and extends radially inward from shaft portion 418 of hub 400. Blades 402 are positioned on hub 400 and extend radially and axially outward from hub 400. Third flange 426 of hub 400 of rotor 326 abuts and rotates with tie rod 316. Third flange 426 of hub 400 mounts rotor 326 to tie rod 316.

Hub 400 and blades 402 further include outer shell 12 that surrounds inner lattice structure 14 in an interior of hub 400 and blades 402. Outer shell 12 is a solid, continuous surface. Inner lattice structure 14 has interspaces 16 therein. Interspaces 16 can hold heat transfer medium 18 therein. Interspaces 16 can be interconnected through lattice interconnections 22 (not shown in FIG. 4B) and can further be connected to an ambient atmosphere through pressure equilibrium holes 24 which extend through outer shell 12 and connect interspaces 16 to the ambient atmosphere. As shown in FIG. 4B, pressure equilibrium holes 24 are substantially larger than interspaces 16. Alternatively, pressure equilibrium holes can be substantially smaller than interspaces 16. In the embodiment shown in FIG. 4B, there are only 2 pressure equilibrium holes 24. In alternative embodiments, there can be a single pressure equilibrium hole. In another alternative embodiment, there can be a plurality of pressure equilibrium holes 24.

There is a gap between blades 402 of rotor 326 and rotor shroud 328 to prevent contact between blades 402 of rotor 326 and rotor shroud 328. Contact between blades 402 and rotor shroud 328 can damage both components. The gap between blades 402 and rotor shroud 328 has to account for deflection that hub 400 and blades 402 of rotor 326 can be subjected to during operation of rotor 326. Thus, the more deformation that hub 400 and blades 402 are subjected to during operation of rotor 326, the larger the gap needs to be to ensure component safety. However, air can leak from cabin air compressor 310 through the gap, which leads to inefficiencies in cabin air compressor 310. Thus, minimizing the gap between blades 402 of rotor 326 and rotor shroud 328 is desired. Pressure equilibrium holes 24 can reduce the gap required as rotor 326 would deflect less due to changes in pressure. The expansion can be further reduced if interspaces 16 are interconnected with lattice interconnections 22. Thus interspaces 16 connected together through lattice interconnections 22 to pressure equilibrium holes 24 would be at a pressure experienced at first side 410. Thus, more of the interspaces would be connected to an ambient pressure. Pressure equilibrium holes 24 are placed on first side 410 to avoid the increased pressure created by blades 402 of rotor 326 when in operation. In alternative embodiments, pressure equilibrium holes 24 can be placed on second side 412, thus interspaces 16 connected together through lattice interconnections 22 to pressure equilibrium holes 24 would be at a pressure experienced at the second side.

As discussed above with respect to FIGS. 1-2B, any suitable additive manufacturing process (also known as a 3D printing process) can be used to manufacture rotor 326, including, for example, direct metal laser sintering, electron beam freeform fabrication, electron-beam melting, selective laser melting, or selective laser sintering. As discussed above with respect to FIGS. 1-2B, additively manufacture component 10, such as rotor 326, can be made out of any material that can be used in an additive manufacturing process, including any of stainless steel, corrosion-resistant steel, nickel-chromium alloy, titanium, aluminum, synthetic fiber, fiberglass, composites, and combinations thereof.

Traditional compressor rotors for rotary machines have solid cross-sections and are manufactured by forging and/or subtractive manufacturing processes, such as hogout. Additively manufacturing rotor 326 allows inner lattice structure 14 to be used in rotor 326. Using inner lattice structure 14 in rotor 326 allows rotor 326 to have a reduced weight compared to traditional rotors, as there are interspaces 16 between lattice structure 14. Rotor 326 also has an equivalent strength as traditional rotors due to the increased strength of inner lattice structure 14.

Reducing the weight while maintaining the strength of rotor 326 allows for the gap between blades 402 of rotor 326 and rotor shroud 328 to be reduced. Reducing the gap between blades 402 of rotor 326 and rotor shroud 28 increases the compression efficiency of cabin air compressor 310 as more air is forced through rotor 326 and into variable diffuser 324.

Rotor 326 is one example of a rotor in which inner lattice structure 14 can be used. In alternate embodiments, inner lattice structure 14 can be used in any suitable rotor, for example a turbine rotor, having any geometry. Further, cabin air compressor 310 is one example of a turbomachinery or rotary machine in which rotor 326 or any other rotor with inner lattice structure 14 can be used. In alternate embodiments, rotor 326 or any other rotor with inner lattice structure 14 can be used in an air cycle machine or any other rotary machine Discussion of Possible Embodiments The following are non-exclusive descriptions of possible embodiments of the present invention.

An additively manufactured component comprising an outer shell, the outer shell enclosing a space therein, an inner lattice structure in the space of the outer shell, and interspaces formed in the inner lattice structure.

The additively manufactured component of the preceding paragraph can optionally include, additionally and/or alternatively, any one or more of the following features, configurations and/or additional components:

A further embodiment of the additively manufactured component, wherein the interspaces of the inner lattice structure are interconnected.

A further embodiment of the additively manufactured component, wherein the outer shell is sealed to an outside environment.

A further embodiment of the additively manufactured component, wherein a heat transfer medium is in the interspaces of the inner lattice structure.

A further embodiment of the additively manufactured component, wherein the heat transfer medium is a gas.

A further embodiment of the additively manufactured component, wherein the heat transfer medium is a liquid.

A further embodiment of the additively manufactured component, wherein the outer shell comprises a pressure equilibration hole extending through the outer shell to an outside environment.

A further embodiment of the additively manufactured component, wherein an inner surface of the interspaces is coated with a thermal radiation reflective coating.

A method of forming an additively manufactured component comprising evacuating a chamber in which the additively manufactured component will be formed and forming in the chamber layer by layer an outer shell enclosing a core, wherein the core comprises a lattice structure with interspaces formed in the lattice structure.

The method forming an additively manufactured component of the preceding paragraph can optionally include, additionally and/or alternatively, any one or more of the following features, configurations and/or additional components:

A further embodiment of the method of forming an additively manufactured component, further comprising flooding the chamber with a selected gas at a selected pressure before forming the outer shell and the core.

A further embodiment of the method of forming an additively manufactured component, wherein the selected gas comprises at least one of krypton, argon, xenon, nitrogen, oxygen, and combinations thereof.

A further embodiment of the method of forming an additively manufactured component, wherein the selected pressure is less than 0.3 ATM.

A further embodiment of the method of forming an additively manufactured component, wherein the selected pressure is less than 0.03 ATM.

A further embodiment of the method of forming an additively manufactured component, further comprising forming a pressure equilibration hole in the outer shell and applying a thermal radiation reflective coating to the lattice structure.

A further embodiment of the method of forming an additively manufactured component, An environmental control system comprising a first component comprising an outer shell and a core enclosed by the outer shell, wherein the core comprises a lattice structure with interspaces.

The environmental control system of the preceding paragraph can optionally include, additionally and/or alternatively, any one or more of the following features, configurations and/or additional components:

A further embodiment of the environmental control system, wherein the interspaces are interconnected.

A further embodiment of the environmental control system, wherein the interspaces are connected to an ambient atmosphere by a pressure equilibration hole extending through the outer shell.

A further embodiment of the environmental control system, the environmental control system further comprising an air cycle machine comprising a hot section with a first impeller and a cold section with a second impeller wherein the first component is a plate axially between the first impeller and the second impeller.

A further embodiment of the environmental control system, wherein the first component is an impeller, and the outer shell of the impeller comprises a flow path surface with at least one blade and a back surface located outside of a flow path of the impeller and a pressure equilibration hole extending through the back surface of the outer shell.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An additively manufactured component comprising:
an outer shell, the outer shell enclosing a space therein, the outer shell having a first side and a second side;
an inner lattice structure in the space of the outer shell; and
interspaces formed in the inner lattice structure, wherein the inner lattice structure comprises:
a first plurality of interconnected interspaces between the first side of the outer shell and a second plurality of interconnected interspaces;
the second plurality of interconnected interspaces between the first plurality of interconnected interspaces and the second side of the outer shell, wherein the first plurality of interconnected interspaces is fluidically isolated from the second plurality of interconnected interspaces, wherein the first plurality of interconnected interspaces encloses a heat transfer medium comprising atmospheric air at ambient pressure, and the second plurality of interconnected interspaces encloses a heat transfer medium comprising at least one of krypton, argon, and xenon at a pressure less than 0.3 ATM; and
a pressure equilibration hole extending through the outer shell to an outside environment, wherein the pressure equilibration hole is smaller than the interspaces of the inner lattice structure and the pressure equilibration hole is connected to the first plurality of interconnected interspaces and fluidically isolated from the second plurality of interconnected interspaces, wherein a pressure at the first side of the outer shell is lower than a pressure at the second side of the outer shell, and further wherein the pressure equilibrium hole is located on the first side of the outer shell.

2. The additively manufactured component of claim 1, wherein the outer shell is sealed to an outside environment.

3. The additively manufactured component of claim 1, wherein an inner surface of at least one of the first and second plurality of interconnected interspaces is coated with a thermal radiation reflective coating.

4. An additively manufactured component comprising:
an outer shell, the outer shell enclosing a space therein, the outer shell having a first side and a second side;
an inner lattice structure in the space of the outer shell; and
interspaces formed in the inner lattice structure, wherein the inner lattice structure comprises:
a first plurality of interconnected interspaces between the first side of the outer shell and a second plurality of interconnected interspaces;
the second plurality of interconnected interspaces between the first plurality of interconnected interspaces and the second side of the outer shell, wherein the first plurality of interconnected interspaces is fluidically isolated from the second plurality of interconnected interspaces, wherein the first plurality of interconnected interspaces encloses a heat transfer medium comprising at least one of krypton, argon, and xenon at a first pressure less than 0.3 ATM and the second plurality of interconnected interspaces encloses a heat transfer medium comprising at least one of krypton, argon, and xenon at a second pressure less than 0.3 ATM, wherein the first pressure and the second pressure are different.

5. An additively manufactured component comprising:
an outer shell, the outer shell enclosing a space therein, the outer shell having a first side and a second side;
an inner lattice structure in the space of the outer shell; and
interspaces formed in the inner lattice structure, wherein the inner lattice structure comprises:
   a first plurality of interconnected interspaces between the first side of the outer shell and a second plurality of interconnected interspaces;
   the second plurality of interconnected interspaces between the first plurality of interconnected interspaces and the second side of the outer shell, wherein the first plurality of interconnected interspaces is fluidically isolated from the second plurality of interconnected interspaces, wherein the first plurality of interconnected interspaces encloses a heat transfer medium comprising ambient air at ambient pressure, and the second plurality of interconnected interspaces encloses a heat transfer medium comprising a liquid comprising at least one of water, oil, heat-transfer fluid, and coolant; and
a pressure equilibration hole extending through the outer shell to an outside environment, wherein the pressure equilibration hole is smaller than the interspaces of the inner lattice structure and the pressure equilibration hole is connected to the first plurality of interconnected interspaces and fluidically isolated from the second plurality of interconnected interspaces, wherein a pressure at the first side of the outer shell is lower than a pressure at the second side of the outer shell, and further wherein the pressure equilibrium hole is located on the first side of the outer shell.

* * * * *